US012602478B2

(12) United States Patent
Johnston et al.

(10) Patent No.: US 12,602,478 B2
(45) Date of Patent: Apr. 14, 2026

(54) MALWARE MONITORING AND DETECTION

(71) Applicant: Rubrik, Inc., Palo Alto, CA (US)

(72) Inventors: Gregory Robert Johnston, Mountain View, CA (US); Ishaan Sang, Mountain View, CA (US); Kunal Sean Munshani, Fremont, CA (US); Adam Gee, Palo Alto, CA (US); Guilherme Menezes, San Jose, CA (US); Kelvin Kwan, San Mateo, CA (US); Shivanshu Agrawal, Sunnyvale, CA (US); Muraliraja Muniraju, Fremont, CA (US); Aaron Chen, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 100 days.

(21) Appl. No.: 18/586,382

(22) Filed: Feb. 23, 2024

(65) Prior Publication Data

US 2025/0272403 A1    Aug. 28, 2025

(51) Int. Cl.
G06F 21/56 (2013.01)
G06F 11/1446 (2026.01)

(52) U.S. Cl.
CPC ........ G06F 21/568 (2013.01); G06F 11/1469 (2013.01); *G06F 2201/84* (2013.01)

(58) Field of Classification Search
CPC . G06F 21/568; G06F 11/1469; G06F 2201/84
USPC ........................................................ 726/24
See application file for complete search history.

(56) References Cited

U.S. PATENT DOCUMENTS

| | | | | |
|---|---|---|---|---|
| 10,291,633 B1 * | 5/2019 | Harang | ............... | H04L 63/145 |
| 12,223,044 B1 * | 2/2025 | Jung | ..................... | G06F 21/564 |
| 2020/0210568 A1 * | 7/2020 | Strogov | ............. | G06F 21/6218 |
| 2021/0081555 A1 * | 3/2021 | Mungre | ................ | G06F 21/564 |
| 2023/0289443 A1 * | 9/2023 | Sinha | .................... | G06F 11/004 |
| 2024/0311472 A1 * | 9/2024 | Zhang | ................... | G06F 21/554 |
| 2025/0036762 A1 * | 1/2025 | Nanivadekar | ........ | G06F 21/568 |
| 2025/0238513 A1 * | 7/2025 | Randolph | ............ | G06F 21/568 |

* cited by examiner

*Primary Examiner* — Meng Vang
(74) *Attorney, Agent, or Firm* — Holland & Hart LLP

(57) ABSTRACT

Methods, systems, and devices for data management are described. A data management system (DMS) may maintain a malware threat feed that includes updated (e.g., periodically or continuously updated) malware intelligence. For example, the malware intelligence may involve YARA rules and known hashes indicative of malware. The DMS may use the malware intelligence to scan each new snapshot of a customer computing system to determine if the new snapshot contains malware. The DMS may periodically, or in response to reception of new malware intelligence, check the files within the most recent snapshot of each computing system for a customer to determine whether any computing system of the customer contains malware. When malware is detected in a file within a snapshot—either based on checking a newly captured snapshot or when checking snapshots based on new malware intelligence—the DMS may determine the temporally first snapshot which contained the corrupted file.

20 Claims, 11 Drawing Sheets

Figure 5:
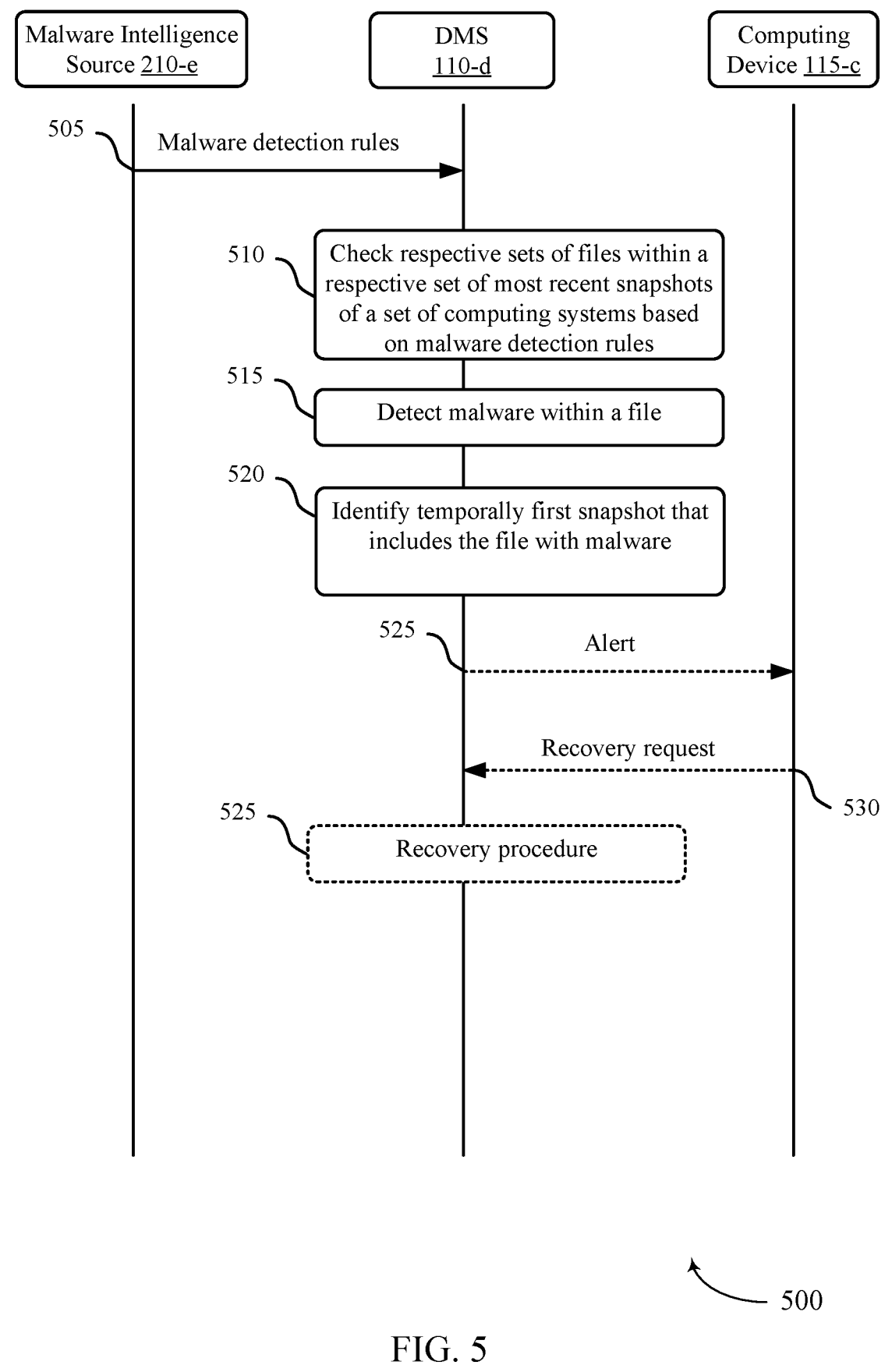

| Malware Intelligence Source 210-e | DMS 110-d | Computing Device 115-c |
|---|---|---|

505 — Malware detection rules →

510 — Check respective sets of files within a respective set of most recent snapshots of a set of computing systems based on malware detection rules 515 — Detect malware within a file 520 — Identify temporally first snapshot that includes the file with malware 525 — Alert →

Recovery request — 530

525 — Recovery procedure

Input Information
810

Output Information
815

Network Interface
825

Storage
840

DMS Manager
820

Memory
830

Processor
835

805

800

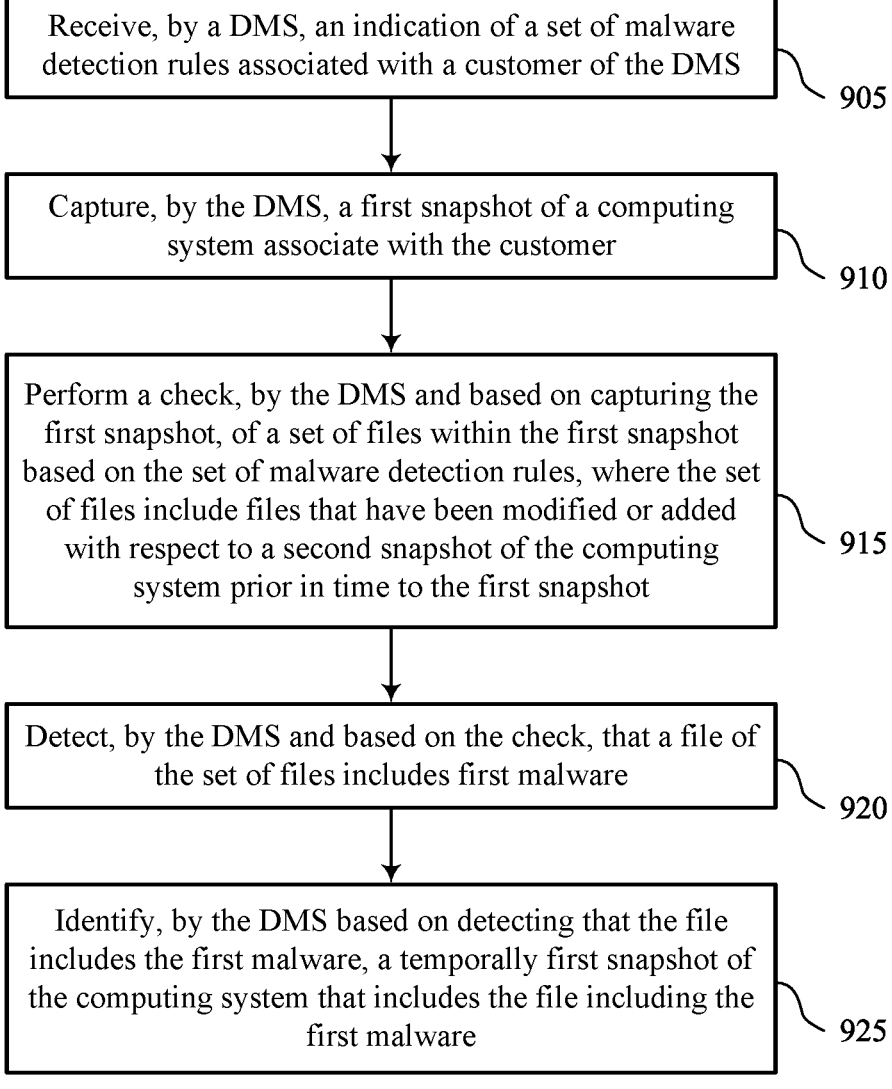

Receive, by a DMS, an indication of a set of malware detection rules associated with a customer of the DMS

905

Capture, by the DMS, a first snapshot of a computing system associate with the customer

910

Perform a check, by the DMS and based on capturing the first snapshot, of a set of files within the first snapshot based on the set of malware detection rules, where the set of files include files that have been modified or added with respect to a second snapshot of the computing system prior in time to the first snapshot

915

Detect, by the DMS and based on the check, that a file of the set of files includes first malware

920

Identify, by the DMS based on detecting that the file includes the first malware, a temporally first snapshot of the computing system that includes the file including the first malware

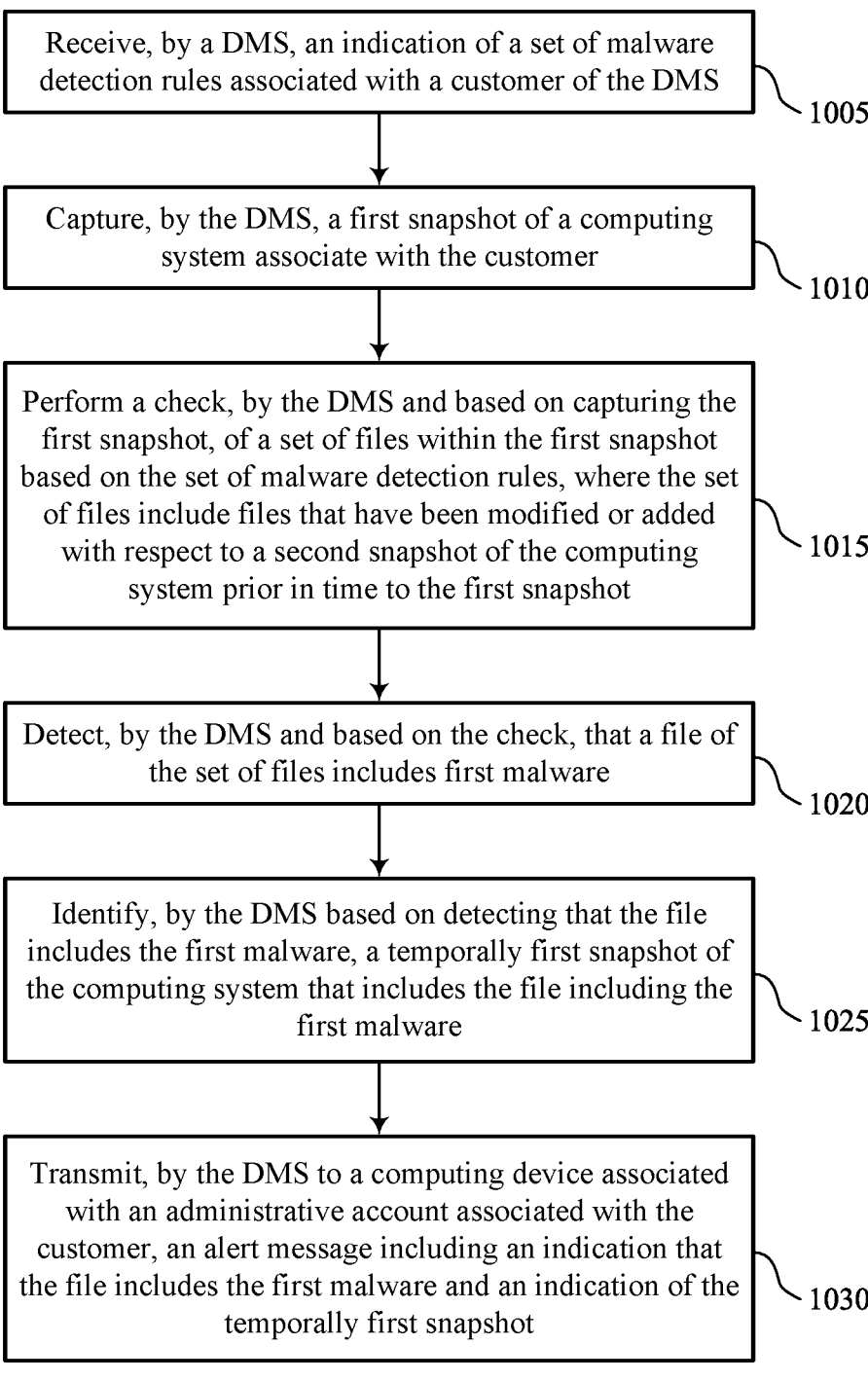

Receive, by a DMS, an indication of a set of malware detection rules associated with a customer of the DMS

1005

Capture, by the DMS, a first snapshot of a computing system associate with the customer

1010

Perform a check, by the DMS and based on capturing the first snapshot, of a set of files within the first snapshot based on the set of malware detection rules, where the set of files include files that have been modified or added with respect to a second snapshot of the computing system prior in time to the first snapshot

1015

Detect, by the DMS and based on the check, that a file of the set of files includes first malware

1020

Identify, by the DMS based on detecting that the file includes the first malware, a temporally first snapshot of the computing system that includes the file including the first malware

1025

Transmit, by the DMS to a computing device associated with an administrative account associated with the customer, an alert message including an indication that the file includes the first malware and an indication of the temporally first snapshot

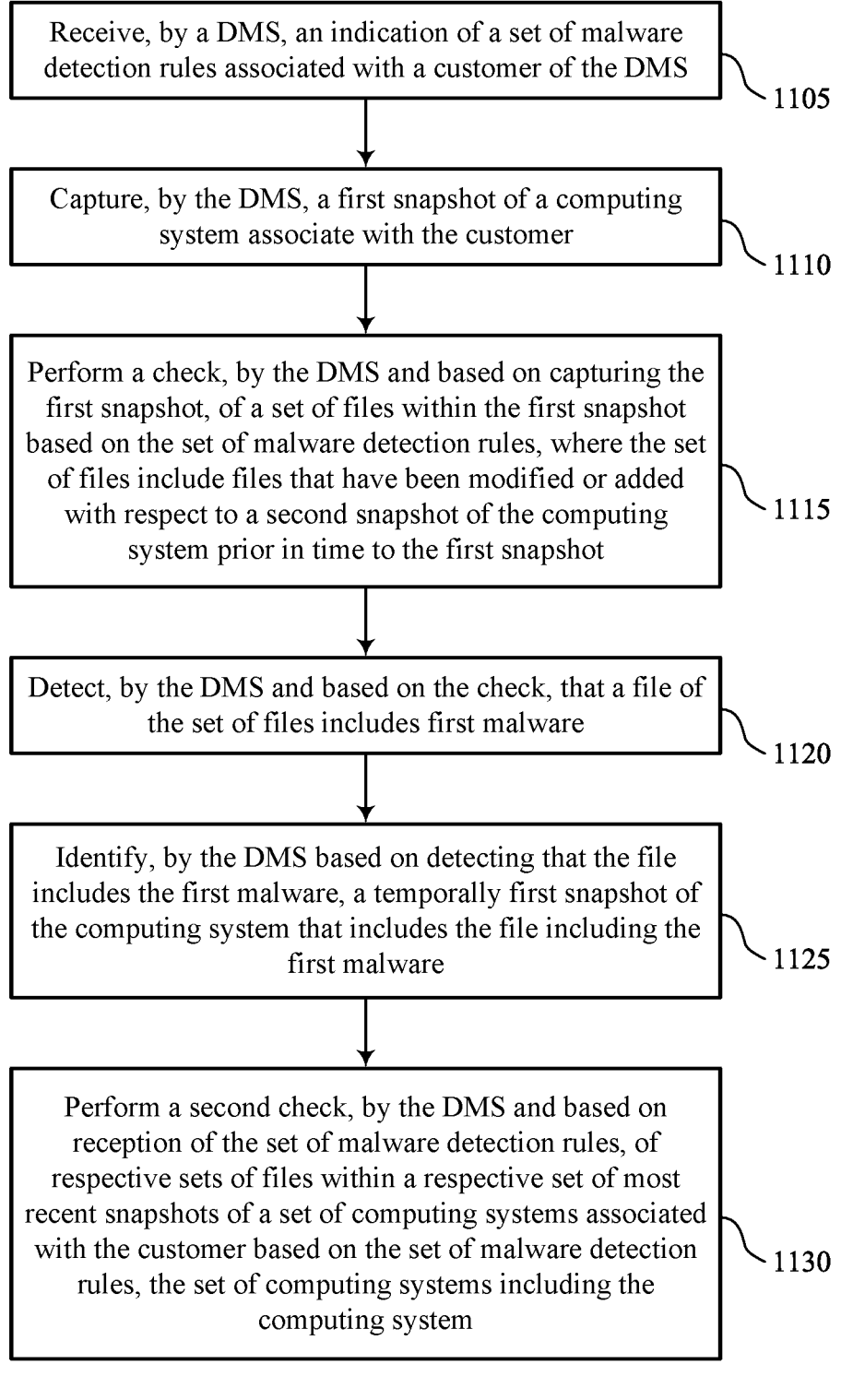

Receive, by a DMS, an indication of a set of malware detection rules associated with a customer of the DMS

— 1105

Capture, by the DMS, a first snapshot of a computing system associate with the customer

— 1110

Perform a check, by the DMS and based on capturing the first snapshot, of a set of files within the first snapshot based on the set of malware detection rules, where the set of files include files that have been modified or added with respect to a second snapshot of the computing system prior in time to the first snapshot

— 1115

Detect, by the DMS and based on the check, that a file of the set of files includes first malware

— 1120

Identify, by the DMS based on detecting that the file includes the first malware, a temporally first snapshot of the computing system that includes the file including the first malware

— 1125

Perform a second check, by the DMS and based on reception of the set of malware detection rules, of respective sets of files within a respective set of most recent snapshots of a set of computing systems associated with the customer based on the set of malware detection rules, the set of computing systems including the computing system

MALWARE MONITORING AND DETECTION

FIELD OF TECHNOLOGY

The present disclosure relates generally to data management, including techniques for malware monitoring and detection.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 5 shows an example of a process flow that supports malware monitoring and detection in accordance with aspects of the present disclosure.

FIGS. 9 through 11 show flowcharts illustrating methods that support malware monitoring and detection in accordance with aspects of the present disclosure.

DETAILED DESCRIPTION

Figure 1:
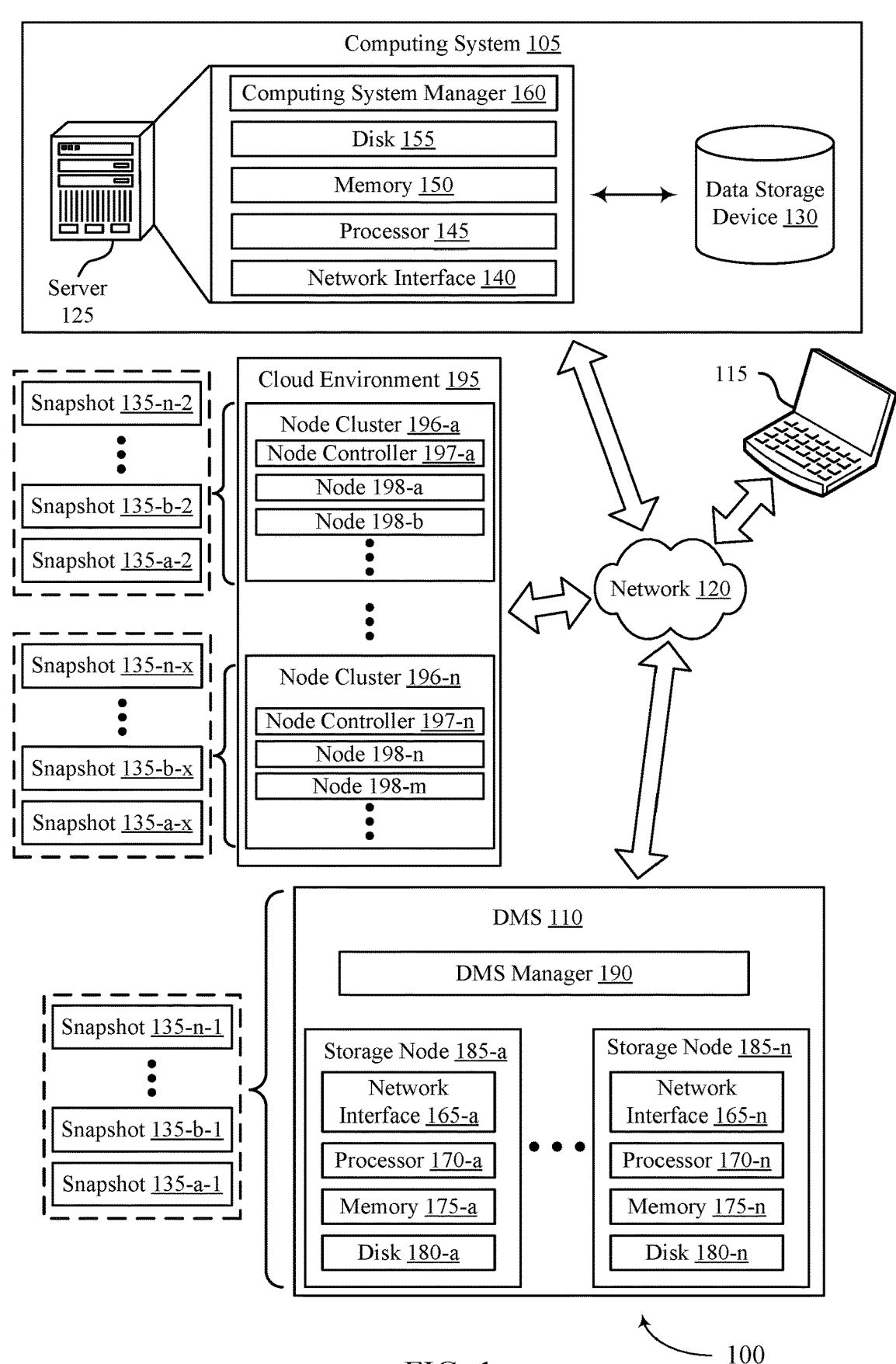
FIGS. 1, 2, and 3 illustrate examples of computing environments that supports malware monitoring and detection in accordance with aspects of the present disclosure.

A data management system (DMS) may include various nodes, clusters, and sub-systems that provide backup and recovery services for customer computing systems. Backup processes may involve capturing snapshots of customer computing systems. The DMS may generate metadata when capturing snapshots, for example, in the form of differential filesystem metadata (diff FMD) files which contain information corresponding to files that have been created, deleted, modified, or otherwise changed since a prior snapshot. Malware may infect computing systems, and new strains of malware constantly may be emerging. Customers may have large amounts of data, which may create challenges with respect to maintaining up to date scans for malware. Further, some malware scanning techniques, such as endpoint protection, do not maintain historical records of computing systems and therefore do not provide a safe recovery point upon detection of malware.

Aspects of this disclosure relate to maintaining a malware threat feed at the DMS that includes updated malware intelligence. For example, the malware intelligence may involve YARA rules and known hashes indicative of malware. The DMS may use the malware intelligence to scan each new snapshot of a customer computing system to determine if the new snapshot contains malware (e.g., the DMS may perform incremental scans on each new snapshot). When checking a new snapshot, the DMS may check the files that were added or modified in the new snapshot (e.g., based on the diff FMD file) to determine whether the malware was introduced into the customer computing system since the snapshot immediately prior to the new snapshot or to determine the first snapshot into which the malware was introduced. Further, when new malware intelligence is received at the DMS, the DMS may check the files within the most recent snapshot of each computing system for a customer to determine whether any computing system of the customer contains malware (e.g., the DMS may perform a full scan for the customer based on newly acquired malware intelligence). A combination of performance of incremental scans on each new snapshot using a full set of malware intelligence maintained at a threat feed and performance of full scans based on newly acquired malware intelligence may ensure that each file backed up by a DMS for a customer is scanned based on up to date malware intelligence information.

In some examples, when malware is detected in a file within a snapshot—either based on checking a newly captured snapshot (e.g., based on an incremental scan) or when checking snapshots based on new malware intelligence (e.g., based on a full scan)—the DMS may determine the temporally first snapshot which contained the corrupted file. Accordingly, the DMS may identify the snapshot immediately prior to that temporally first snapshot as a safe recovery point. The DMS may provide backup and recovery services for multiple customers, and each customer may have their own malware intelligence feed. Further, the DMS may maintain a malware intelligence feed that is applicable to multiple or all customers.

FIG. 1 illustrates an example of a computing environment 100 that supports malware monitoring and detection in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object.

For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The DMS 110 may generate metadata when capturing snapshots 135, for example, in the form of differential filesystem metadata (diff FMD) files which contain information corresponding to files that have been created, deleted, modified, or otherwise changed since a prior snapshot 135.

The DMS 110 may maintain a malware threat feed (e.g., via the network 120) that includes updated malware intelligence. For example, the DMS 110 may receive malware intelligence from malware intelligence subscriptions. For example, a customer of the DMS 110 may subscribe to one or more malware intelligence services, and/or the DMS 110 may subscribe to one or more malware intelligence services. For example, the malware intelligence may involve YARA rules and known hashes indicative of malware. The DMS 110 may use the malware intelligence to scan each new snapshot 135 of the computing system 105 to determine if the new snapshot 135 contains malware. When checking a new snapshot 135, the DMS 110 may check the files that were added or modified in the new snapshot 135 (e.g., based on the diff FMD file) against the malware intelligence maintained at a threat feed at the DMS 110 to determine whether the malware was introduced into the customer computing system since the snapshot 135 immediately prior to the new snapshot 135 or to determine the first snapshot 135 into which the malware was introduced.

In some examples, when new malware intelligence is received at the DMS 110, or periodically in accordance with a service level agreement (SLA) with a customer, the DMS 110 may check the files within the most recent snapshot of each computing system for a customer to determine whether any computing system of the customer contains malware. When malware is detected in a file within a snapshot 135—either based on checking a newly captured snapshot 135 or when checking snapshots 135 based on new malware intelligence—the DMS 110 may determine the temporally first snapshot 135 which contained the corrupted file. Accordingly, the DMS may identify the snapshot 135 immediately prior to that temporally first snapshot 135 as a safe recovery point. The DMS 110 may provide backup and recovery services for multiple customers, and each customer may have their own malware intelligence feed. Further, the DMS 110 may maintain a malware intelligence feed that is applicable to multiple or all customers.

Figure 2:
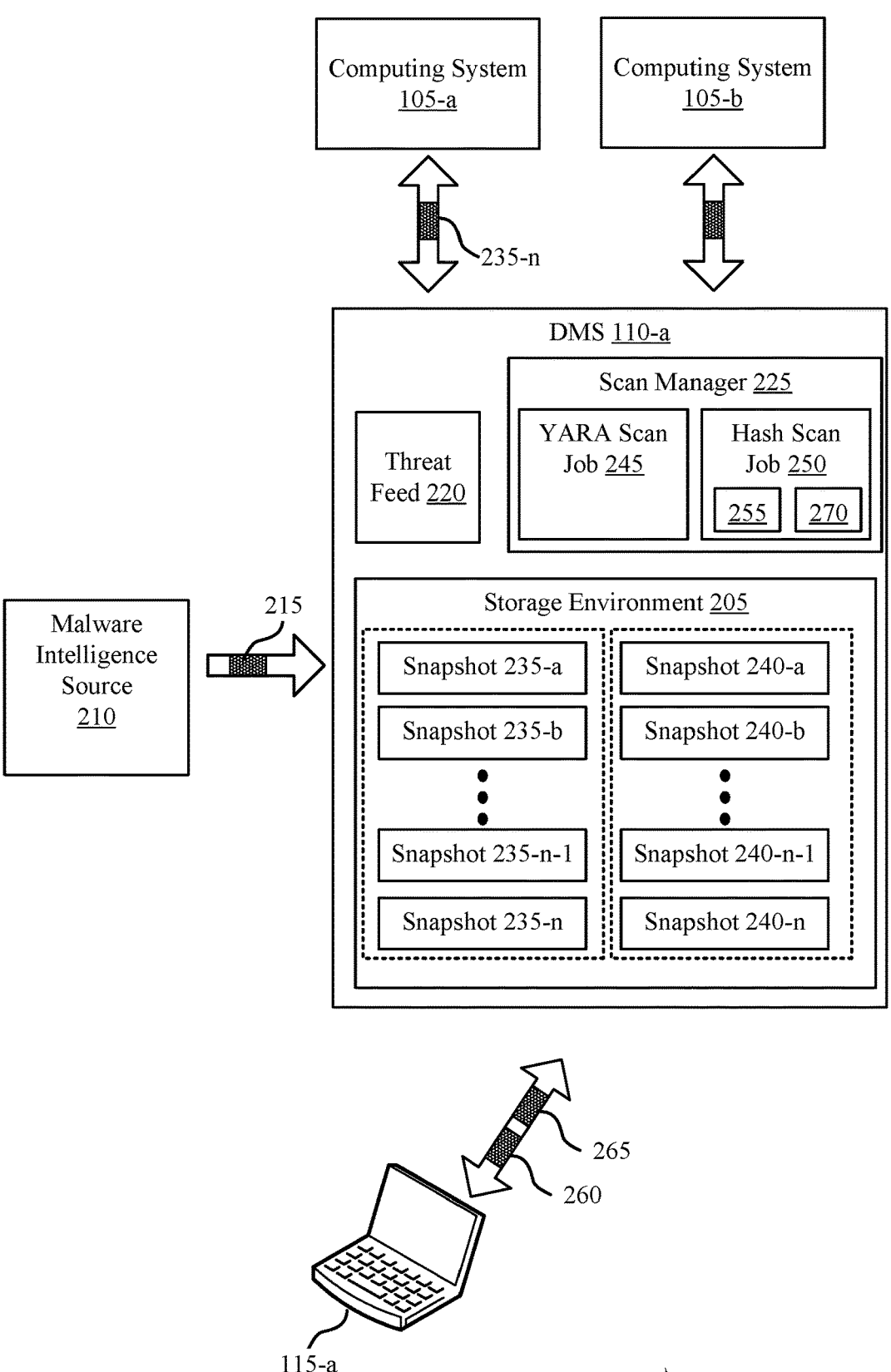

FIG. 2 shows an example of a computing environment 200 that supports malware monitoring and detection in accordance with aspects of the present disclosure. The computing environment 200 may implement one or more aspects of the computing environment 100. For example, the computing environment 200 includes a DMS 110-a which may be an example of the DMS 110 as described herein. The computing environment 200 may include a computing device 115-a, which may be an example of a computing device 115 as described herein. The computing environment 200 may include a computing system 105-a and a computing system 105-b, which may be examples of computing systems 105 as described herein.

The DMS 110-a may provide backup services for a customer. For example, the DMS 110-a may capture and store snapshots of computing systems 105 associated with the customer. For example, the DMS 110-a may capture and store the snapshots 235 of a computing system 105-a of the customer and snapshots 240 of a computing system 105-b in a storage environment 205. In some examples, the storage environment 205 may be one or more storage nodes 185 at the DMS 110-*a* as described with reference to FIG. 1. In some examples, the storage environment 205 may be an external storage environment accessible to the DMS 110-*a* such as the cloud environment 195 as described with reference to FIG. 1.

The DMS 110-*a* may receive new malware intelligence information 215 (e.g., a set of malware detection rules) from a malware intelligence source 210. For example, the DMS 110-*a* may maintain a malware intelligence subscription that may provide periodic updates or updated malware intelligence as the intelligence is acquired by the malware intelligence subscription. In some examples, in addition to or alternatively to the DMS malware intelligence subscription, the customer may have a subscription to a malware intelligence source to which the DMS 110-*a* may have access. The DMS 110-*a* may maintain a threat feed 220 which includes the new malware intelligence information 215 received from malware intelligence source 210. For example, the threat feed 220 may accumulate and/or update malware intelligence information received from the malware intelligence source 210 or from multiple malware intelligence sources. In some examples, the malware intelligence information maintained at the threat feed 220 may include hashes indicative of malware. In some examples, the malware intelligence information maintained at the threat feed 220 may include YARA rules. YARA rules may classify and identify malware samples and may construct descriptions of malware families rooted in textual or binary patterns. YARA rules may be structured around sets of strings, regular expressions, and conditional logic that may be designed to detect specific byte sequences or behaviors in the analyzed malware samples. YARA rules may be used to check files and networks for patterns, scripts and signatures that indicate the presence of malicious software (e.g., malware). In some examples, new YARA rules may be published to the DMS 110-*a* on a regular basis. In some examples, the DMS 110-*a* may generate malware intelligence internally (e.g., may generate malware intelligence at the threat feed) based on malware known to an administrator of the DMS 110-*a*.

The DMS 110-*a* may include a scan manager 225 that may use the malware intelligence maintained at the threat feed 220 to scan files in the snapshots (e.g., the snapshots 235 and the snapshots 240) of the computing systems 105 (e.g., the computing system 105-*a* and the computing system 105-*b*) associated with the customer. In some examples, the scan manager 225 may include a YARA scan job 245 that may scan files in snapshots against the YARA rules. In some examples, the scan manager 225 may include a hash scan job 250 that may perform hash analysis on hashes of files in the snapshots (e.g., the snapshots 235 and the snapshots 240) using hash intelligence maintained at the threat feed 220 and provided by a malware intelligence source.

In some examples, based on capturing a new snapshot 235-*n* of the computing system 105-*a*, the DMS 110-*a* may perform (e.g., the YARA scan job 245 may perform) a YARA scan on files in the new snapshot 235-*n* using YARA rules maintained at the threat feed 220 and/or the DMS 110-*a* may perform (e.g., the Hash scan job 250 may perform) hash analysis on the new snapshot 235-*n* using hash intelligence maintained at the threat feed 220.

For example, when the new snapshot 235-*n* is captured, the full set of YARA rules maintained at the threat feed 220 may be used to scan the files that are new or modified in the snapshot 235-*n* with respect to a prior snapshot 235 of the computing system 105-*a*. For example, the prior snapshot 235 may be a previously analyzed snapshot 235 (e.g., a previous snapshot 235 whose new/modified files have been checked against the full set of YARA rules). For example, the prior snapshot 235 may be an immediately prior snapshot 235-*n*−1 that has been checked against the full set of YARA rules. For example, the DMS 110-*a* may identify the files that are new or modified in the snapshot 235-*n* with respect to an immediately prior snapshot 235-*n*−1 based on a diff FMD generated by the DMS 110-*a* during the capture process of the snapshot 235-*n*. In some examples, the DMS 110-*a* may include an incremental scan job manager that may run the YARA scan job 245 for each new snapshot of each computing system associated with the customer. For example, the incremental scan job manager may periodically check for new snapshots associated with the customer added to the storage environment 205 and may run the YARA scan job 245 to check each new snapshot associated with the customer against the latest YARA rules in the threat feed 220.

As another example, when the new snapshot 235-*n* is captured, the hash scan job may compute hashes of the files in the snapshot 235-*n* that are new or modified in the snapshot 235-*n* with respect to the immediately prior snapshot 235-*n*−1 of the computing system 105-*a*. The computed hashes of the new or modified files may be compared to a bloom filter 255 representative of the hash intelligence at the threat feed 220. The bloom filter 255 may be used by the DMS 110-*a* to check if new or modified files contain any known malware (e.g., based on the intelligence stored in the threat feed 220). For example, the bloom filter 255 may enable the DMS 110-*a* (e.g., the hash scan job 250) to compare the hashes of the new or modified files to millions of known malware strains. The bloom filter 255 may be a space efficient, probabilistic data structure that is used to add elements to a set and check if an element is contained in the set, where the "set" refers to the known indicators of malware (e.g., compromise indicators). If a given computed hash of a modified or added file matches a known indicator of malware based on the bloom filter 255, the DMS 110-*a* (e.g., the hash scan job 250) may verify the indicated malware in the file against known malware indicators maintained at the threat feed 220. For example, as the bloom filter 255 may be probabilistic, false positives may occur, and accordingly files that the bloom filter 255 indicates as positive for malware may be checked against a known database of malware to confirm infection.

If malware is detected in a file of the snapshot 235-*a* based on a scan performed by the YARA scan job 245 of the new snapshot 235-*n* or based on the hash analysis performed by the hash scan job 250, an alert 260 may be provided to a computing device 115-*a* associated with an administrative account of the customer. For example, the alert 260 may be an email or a message on a user interface at the computing device 115-*a* for interfacing with the DMS 110-*a* for the customer. The alert 260 may indicate that the file includes malware, and the alert 260 may indicate a temporally first snapshot of the computing system 105-*a* that included the file. Accordingly, the customer (e.g., the administrator) may identify a temporally first snapshot of the computing system 105-*a* that does not include the file as a safe recovery point for the computing system 105-*a*. In some examples, the first snapshot of the computing system 105-*a* that included the file may be identified by the DMS 110-*a* based on checking the snapshots 235 for the file index corresponding to the file that includes the malware. In some examples, the alert 260 may identify the first snapshot that does not include the file as a safe recovery point. For example, if the file was introduced in the snapshot 235-*b*, the safe recovery snapshot for the computing system 105-*a* may be the snapshot 235-*a*. In some examples, the DMS 110-*a* may receive a command 265 from the computing device 115-*a* to perform a recovery procedure for the computing system in response to the alert 260. The command 265 may indicate the snapshot (e.g., the snapshot 235-*a*) to use as the recovery snapshot. The DMS 110-*a* may perform a recovery procedure for the computing system 105-*a* using the indicated recovery snapshot in the command 265.

In some cases, a full scan job of the DMS 110-*a* may scan the most recent snapshot against new malware detection rules in the new malware intelligence information 215 received from the malware intelligence source 210. In some examples, the full scan job may run periodically. In some examples, the full scan job may be triggered by reception of new malware intelligence information 215. For example, either periodically or in response to the reception of the new malware intelligence information 215, the full scan job may compare the new malware intelligence information 215 against the malware against the malware intelligence stored in the threat feed 220 which was used for a most recent full scan. If the new malware intelligence information 215 includes malware detection rules that were not included in the malware intelligence which was used for a most recent full scan, the full scan job of the DMS 110-*a* may trigger a full scan for the snapshots associated with the customer (e.g., the snapshots 235 and the snapshots 240) using the new malware intelligence information 215 (e.g., using the malware detection rules in the new malware intelligence information 215 that was not included in the malware intelligence which was used for a most recent full scan).

When a full scan is triggered, the full scan job may scan all of the files in the latest snapshot of each computing system associated with a customer against the new malware detection rules in the new malware intelligence information 215.

A full scan may involve a full YARA scan, which may be performed by the YARA scan job 245. For example, the new YARA threat intelligence in the new malware intelligence information 215 may be used to scan the full content of all of the files in the latest snapshot of each computing system 105 associated with the customer. For example, the latest snapshot of the computing system 105-*a* may be the snapshot 235-*n*, and the latest snapshot of the computing system 105-*b* may be the snapshot 240-*n*.

A full scan may involve checking, by the hash scan job 250 of the DMS 110-*a* for each new indicator of malware in the new malware intelligence information 215 in the hash catalog 270 of the customer. The hash catalog 270 for a given customer may include a hash of each file included in the snapshots (e.g., the snapshots 235 and the snapshots 240) associated with the customer that were new or modified with respect to a prior snapshot (e.g., and all of the files in a base snapshot). When hashes are computed as part of an incremental scan in response to capturing a snapshot, the hashes may be added to the hash catalog. Thus, the hash catalog may include hashes of each modified or added file in each snapshot for a customer. In some examples, the hash catalog may be maintained at a cloud storage environment. The hashes indicative of malware in the new malware intelligence information 215 may be compared to the hash catalog for a customer to determine if the hashes of any files in the hash catalog match known indicators of malware. A match may indicate that the corresponding file includes malware.

If malware is detected in a file based on a full scan job, an alert 260 may be provided to a computing device 115-*a* associated with an administrative account of the customer.

For example, the alert 260 may be an email or a message on a user interface at the computing device 115-*a* for interfacing with the DMS 110-*a* for the customer. The alert 260 may indicate that the file includes malware, and may indicate a first snapshot of the corresponding computing system 105 that included the file. Accordingly, the customer (e.g., the administrator) may identify a first snapshot that does not include the file as a safe recovery point for the corresponding computing system. In some examples, the first snapshot of the corresponding computing system 105 that included the file may be identified by the DMS 110-*a* based on checking the snapshots 235 for the file index corresponding to the file that includes the malware. In some examples, the alert 260 may identify the first snapshot that does not include the file as a safe recovery point. For example, if the file was introduced in snapshot 235-*b*, the safe recovery snapshot for the computing system 105-*a* may be the snapshot 235-*a*. In some examples, the DMS 110-*a* may receive a command 265 from the computing device 115-*a* to perform a recovery procedure for the computing system in response to the alert 260. The command 265 may indicate the snapshot (e.g., the snapshot 235-*a*) to use as the recovery snapshot. The DMS 110-*a* may perform a recovery procedure for the computing system 105-*a* using the indicated recovery snapshot in the command 265.

The combination of the incremental scan job being performed on each new snapshot, and the full scan for new malware intelligence being performed on the most recent snapshots of the computing systems 105 (for YARA rules) and the hash catalog 270 (for hashes) may ensure that all files associated with a customer that are backed up by the DMS 110-*a* may be scanned for the latest malware intelligence received by the DMS 110-*a*.

Figure 3:
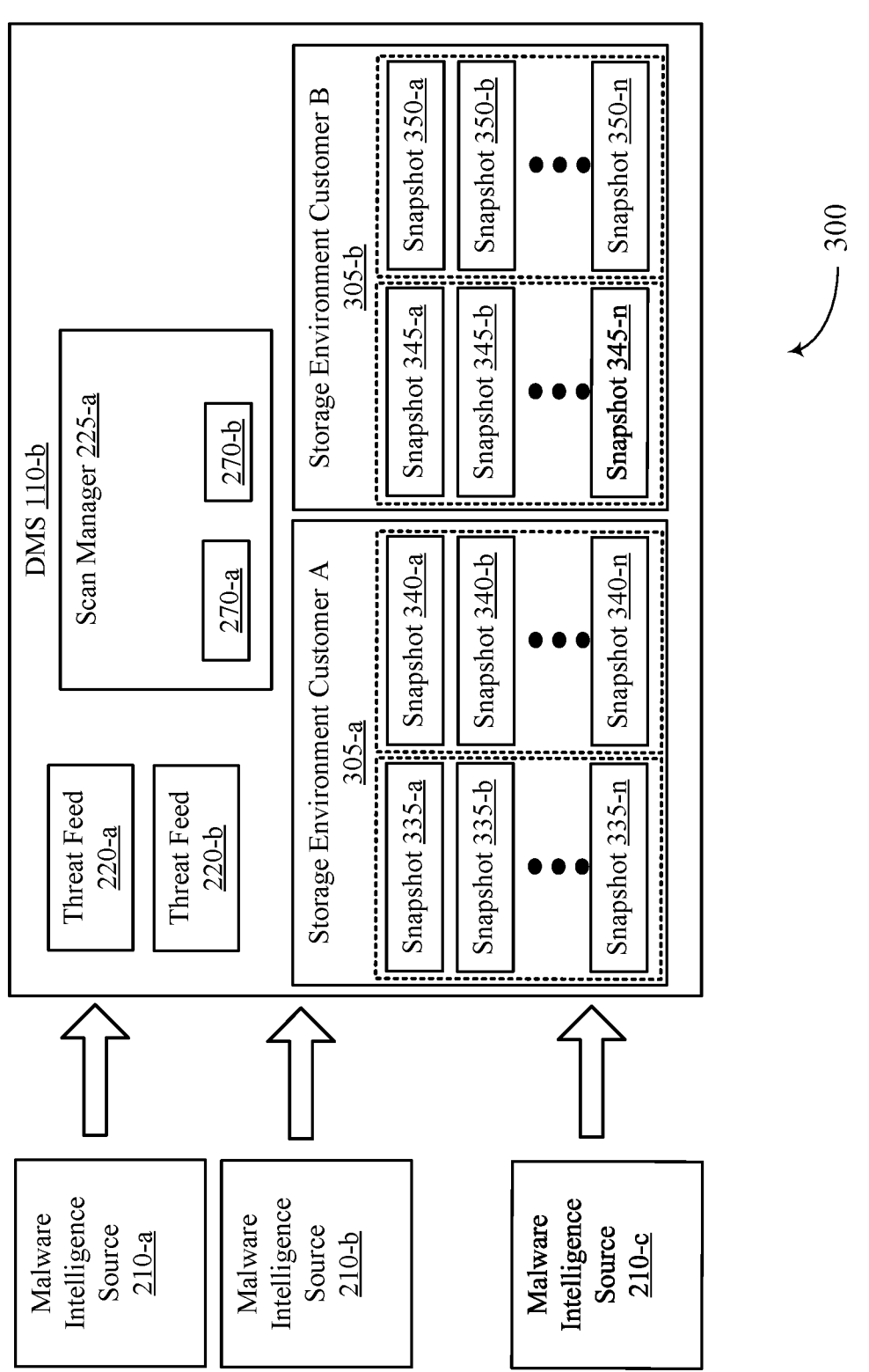

FIG. 3 shows an example of a computing environment 300 that supports malware monitoring and detection in accordance with aspects of the present disclosure. The computing environment 300 may implement one or more aspects of the computing environment 100 or the computing environment 200. For example, the computing environment 300 includes a DMS 110-*b* which may be an example of the DMS 110 as described herein.

The DMS 110-*b* may provide backup services for multiple customers (e.g., a customer A and a customer B). The DMS 110-*b* may capture and store the snapshots 335 of a first computing system of the customer A and the snapshots 340 of a second computing system of the customer A. The DMS 110-*b* may store the snapshots 335 and the snapshots 340 in a first storage environment 305-*a* for the customer A. The DMS 110-*b* may capture and store the snapshots 345 of a first computing system of the customer B and the snapshots 350 of a second computing system of the customer B. The DMS 110-*b* may store the snapshots 345 and the snapshots 340 in a second storage environment 305-*b* for the customer B. In some examples, the first storage environment 305-*a* and the second storage environment 305-*b* may be one or more storage nodes 185 at the DMS 110-*a* as described with reference to FIG. 1. In some examples, the first storage environment 305-*a* and the second storage environment 305-*b* be an external storage environments accessible to the DMS 110-*a* such as the cloud environment 195 as described with reference to FIG. 1.

The DMS 110-*b* may receive malware intelligence information from multiple malware intelligence sources. For example, a first malware intelligence source 210-*a* may be associated with the customer A, a second malware intelligence source 210-*b* may be associated with the customer B, and a third malware intelligence source 210-*c* may be applicable or applied by the DMS 110-b to multiple customers (e.g., all customers) of the DMS 110-b.

The DMS 110-b may maintain separate threat feeds for different customers. For example, the DMS 110-b may maintain a first threat feed 220-a for the customer A that may include malware intelligence information received from the first malware intelligence source 210-a and/or the third malware intelligence source 210-c. The DMS 110-b may maintain a second threat feed 220-b for the customer B that may include malware intelligence information received from the second malware intelligence source 210-b and/or the third malware intelligence source 210-c. Similarly, the DMS 110-b may maintain a first hash catalog 270-a for the customer A and a second hash catalog 270-b for the customer B. The scan manager 225-a of the DMS 110-b may use the first threat feed 220-a to run incremental scans on new snapshots of the snapshots 335 or the snapshots 340 or full scans on the snapshots 335 and the snapshots 340. The scan manager 225-a of the DMS 110-b may use the first hash catalog 270-a to perform a hash analysis for a full scan based on reception of new malware intelligence information at the first threat feed 220-a for the customer A. Similarly, the scan manager 225-a of the DMS 110-b may use the second threat feed 220-b to run incremental scans on new snapshots of the snapshots 345 or the snapshots 340 or full scans on the snapshots 345 and the snapshots 350 for the customer B. The scan manager 225-a of the DMS 110-b may use the second hash catalog 270-b to perform a hash analysis for a full scan based on reception of new malware intelligence information at the second threat feed 220-b for the customer B. If the DMS 110-b detects malware in a file of one of the customers, the DMS 110-b may provide an alert to a computing device 115 associated with the corresponding customer as described herein.

Figure 4:
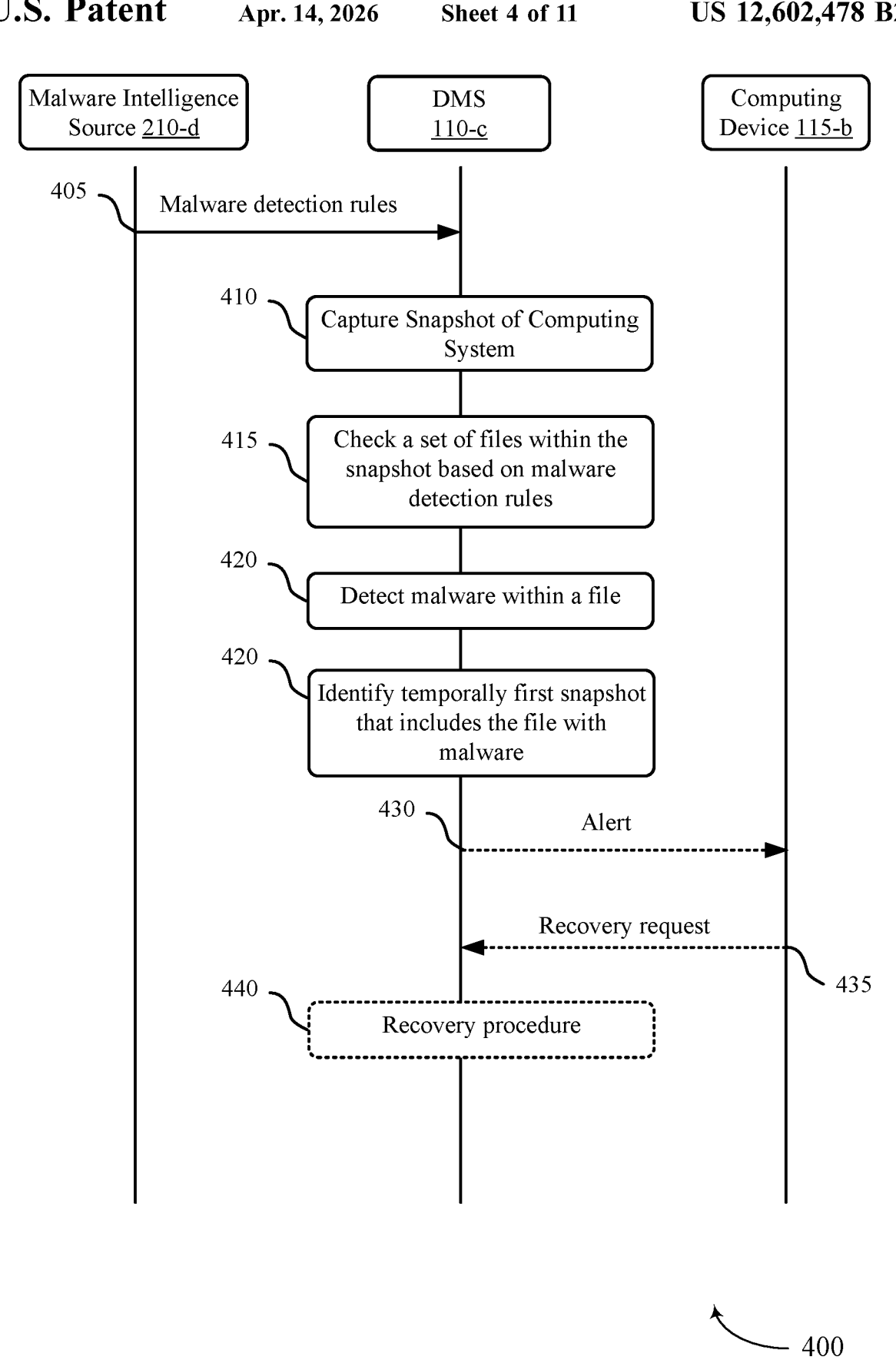
FIG. 4 shows an example of a process flow that supports malware monitoring and detection in accordance with aspects of the present disclosure.

FIG. 4 shows an example of a process flow 400 that supports malware monitoring and detection in accordance with aspects of the present disclosure. The process flow 400 may implement one or more aspects of the computing environment 100, the computing environment 200, or the computing environment 300. For example, the process flow 400 may include a DMS 110-c, a malware intelligence source 210-d, and a computing device 115-b, which may be examples of a DMS 110, a malware intelligence source 210, and a computing device 115 as described herein. In the following description of the process flow 400, operations between the DMS 110-c, the malware intelligence source 210-d, and the computing device 115-b may be added, omitted, or performed in a different order (with respect to the exemplary order shown).

At 405, the DMS 110-c may receive an indication of a set of malware detection rules associated with a customer of the DMS 110-c. In some examples, the set of malware detection rules may include a first subset of malware detection rules specific to the customer and a second subset of malware detection rules common to a set of multiple customers of the DMS 110-c. For example, the DMS 110-c may receive the first subset from a malware intelligence subscription specific to the customer, and the DMS 110-c may receive the second subset from malware intelligence subscription applicable to multiple customers of the DMS 110-c.

At 410, the DMS 110-c may capture a first snapshot of a computing system associated with the customer.

At 415, the DMS 110-c may perform a check, based on capturing the snapshot, of a set of files within the first snapshot based on the set of malware detection rules. The set of files may include files that have been modified or added with respect to a second snapshot of the computing system prior in time to the first snapshot. In some examples, an incremental scan job may periodically check for new snapshots at the DMS 110-c, and may trigger the check based on detecting that the DMS 110-c captured the first snapshot.

In some examples, performing the check at 415 may include scanning the set of files against a set of YARA rules, the set of malware detection rules including the set of YARA rules. In some examples, performing the check at 415 may include: computing a respective set of hashes for the set of files; and performing a comparison of the respective set of hashes to a bloom filter representative of a set of hashes indicative of malware, the set of malware detection rules including the set of hashes indicative of malware.

At 420, the DMS 110-c may detect, based on the check at 415, that a file of the set of files includes first malware.

At 425, the DMS 110-c may identify, based on detecting at 420 that the file includes the first malware, a temporally first snapshot of the computing system that includes the file including the first malware.

In some examples, at 430, the DMS 110-c may transmit, to the computing device 115-b, an alert message that includes an indication that the file includes the first malware and an indication of the temporally first snapshot. The computing device 115-b may be associated with an administrative account associated with the customer.

In some examples, at 435, the DMS 110-c may receive, from the computing device 115-b and based on the alert message at 430, a recovery request message. The recovery request message may include an indication to perform a recovery procedure for the computing system using a recovery snapshot that is temporally prior to the temporally first snapshot.

In some examples, at 440, the DMS 110-c may perform the recovery procedure based on the recovery request message.

In some examples, the DMS 110-c may identify, based on detecting that the file includes the first malware, the recovery snapshot. The recovery snapshot may be the snapshot that is immediately prior in time to the temporally first snapshot in a chain of snapshots of the computing system. In some examples, the alert message at 430 may indicate the recovery snapshot identified by the DMS 110-c.

In some examples, the DMS 110-c may receive an indication of a second set of malware detection rules associated with a second customer of the DMS 110-c. The second set of malware detection rules may include a third subset of malware detection rules specific to the customer and the second subset of malware detection rules common to the multiple customers of the DMS 110-c. In some examples, the DMS 110-c may capture a third snapshot of a second computing system associated with the second customer. In such examples, the DMS 110-c may perform a second check, based on capturing the third snapshot, of a second set of files within the third snapshot based on the set of malware detection rules, where the second set of files may include files that have been modified or added with respect to a fourth snapshot of the second computing system prior in time to the third snapshot. In such examples, the DMS 110-c may detect, based on the check, that a second file of the set of files includes second malware. In such examples, the DMS 110-c may identify, based on detecting that the second file includes the second malware, a second temporally first snapshot of the second computing system that includes the second file including the second malware. In some examples, the DMS 110-c may transmit an alert to a second computing device associated with the second customer that includes an indication that the second file includes the second malware and an indication of the second temporally first snapshot.

FIG. 5 shows an example of a process flow 500 that supports malware monitoring and detection in accordance with aspects of the present disclosure. The process flow 500 may implement one or more aspects of the computing environment 100, the computing environment 200, or the computing environment 300. For example, the process flow 500 may include a DMS 110-*d*, a malware intelligence source 210-*e*, and a computing device 115-*c*, which may be examples of a DMS 110, a malware intelligence source 210, and a computing device 115 as described herein. In the following description of the process flow 500, operations between the DMS 110-*d*, the malware intelligence source 210-*e*, and the computing device 115-*c* may be added, omitted, or performed in a different order (with respect to the exemplary order shown).

At 505, the DMS 110-*d* may receive an indication of a set of malware detection rules associated with a customer of the DMS 110-*d*. In some examples, the set of malware detection rules may include a first subset of malware detection rules specific to the customer and a second subset of malware detection rules common to a set of multiple customers of the DMS 110-*d*. For example, the DMS 110-*d* may receive the first subset from a malware intelligence subscription specific to the customer, and the DMS 110-*d* may receive the second subset from malware intelligence subscription applicable to multiple customers of the DMS 110-*c*.

At 510, the DMS 110-*d* may perform a check, based on reception of the set of malware detection rules, of respective sets of files within a respective set of most recent snapshots of a set of computing systems associated with the customer based on the set of malware detection rules.

At 515 the DMS 110-*d* may detect, based on the check at 510, that a file of a respective set of files within a first most recent snapshot of the respective set of most recent snapshots corresponding to a first respective computing system of the set of computing systems includes first malware.

At 520, the DMS 110-*d* may identify, based on detecting that the file includes the first malware, a temporally first snapshot of the first respective computing system that includes the file including the first malware.

In some examples, at 525, the DMS 110-*d* may transmit, to the computing device 115-*c*, an alert message that includes an indication that the file includes the first malware and an indication of the temporally first snapshot. The computing device 115-*c* may be associated with an administrative account associated with the customer.

In some examples, at 530, the DMS 110-*d* may receive, from the computing device 115-*b* and based on the alert message at 525, a recovery request message. The recovery request message may include an indication to perform a recovery procedure for the first respective computing system using a recovery snapshot that is temporally prior to the temporally first snapshot.

In some examples, at 535, the DMS 110-*d* may perform the recovery procedure based on the recovery request message.

In some examples, the DMS 110-*d* may identify, based on detecting that the file includes the first malware, the recovery snapshot. The recovery snapshot may be the snapshot that is immediately prior in time to the temporally first snapshot in a chain of snapshots of the first respective computing system. In some examples, the alert message at 430 may indicate the recovery snapshot identified by the DMS 110-*d*.

In some examples, the DMS 110-*d* may identify that a time period since a last check of the respective sets of files within the respective set of most recent snapshots of the set of computing systems satisfies a threshold time period, and performance of the check at 510 may be based on identifying that the time period satisfies the threshold time period, In some examples, performing the check at 510 may include scanning the respective sets of files against a set of YARA rules, the set of malware detection rules including the set of YARA rules. In some examples, the set of YARA rules may be a subset of YARA rules received in the malware detection rules that are different from a prior set of YARA rules stored at a threat feed at the DMS 110-*d*.

In some examples, performing the check at 510 may include performing a comparison of a hash catalog associated with the customer to a set of hashes indicative of malware, the set of malware detection rules including the set of hashes indicative of malware. For example, the hash catalog associated with the customer may include hashes of each modified or added file in each snapshot of the set of computing systems.

Figure 6:
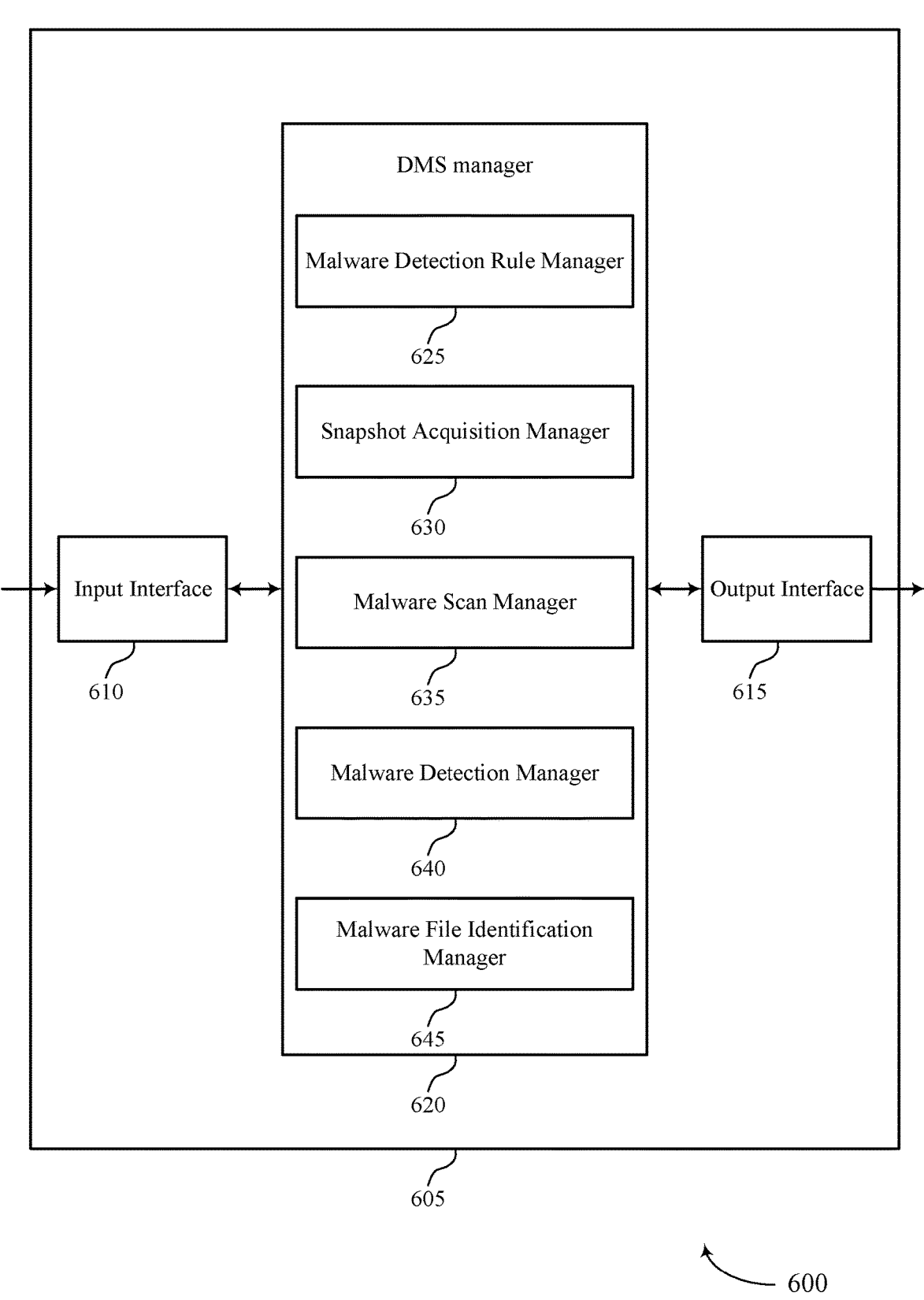
FIG. 6 shows a block diagram of an apparatus that supports malware monitoring and detection in accordance with aspects of the present disclosure.

FIG. 6 shows a block diagram 600 of a system 605 that supports malware monitoring and detection in accordance with aspects of the present disclosure. In some examples, the system 605 may be an example of aspects of one or more components described with reference to FIG. 1, such as a DMS 110. The system 605 may include an input interface 610, an output interface 615, and a DMS manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the DMS manager 620 to support malware monitoring and detection. In some cases, the input interface 610 may be a component of a network interface 825 as described with reference to FIG. 8.

The output interface 615 may manage output signaling for the system 605. For example, the output interface 615 may receive signaling from other components of the system 605, such as the DMS manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the DMS manager 620 may include a malware detection rule manager 625, a snapshot acquisition manager 630, a malware scan manager 635, a malware detection manager 640, a malware file identification manager 645, or any combination thereof. In some examples, the DMS manager 620, or various components thereof, may be configured to perform various operations (e.g., receiving, monitoring, transmitting) using or otherwise in cooperation with the input interface 610, the output interface 615, or both. For example, the DMS manager 620 may receive information from the input interface 610, send information to the output interface 615, or be integrated in combination with the input interface 610, the output interface 615, or both to receive information, transmit information, or perform various other operations as described herein.

The malware detection rule manager 625 may be configured as or otherwise support a means for receiving, by a DMS, an indication of a set of malware detection rules associated with a customer of the DMS. The snapshot acquisition manager 630 may be configured as or otherwise support a means for capturing, by the DMS, a first snapshot of a computing system associated with the customer. The malware scan manager 635 may be configured as or otherwise support a means for performing a check, by the DMS and based on capturing the first snapshot, of a set of files within the first snapshot based on the set of malware detection rules, where the set of files include files that have been modified or added with respect to a second snapshot of the computing system prior in time to the first snapshot. The malware detection manager 640 may be configured as or otherwise support a means for detecting, by the DMS and based on the check, that a file of the set of files includes first malware. The malware file identification manager 645 may be configured as or otherwise support a means for identifying, by the DMS based on detecting that the file includes the first malware, a temporally first snapshot of the computing system that includes the file including the first malware.

Figure 7:
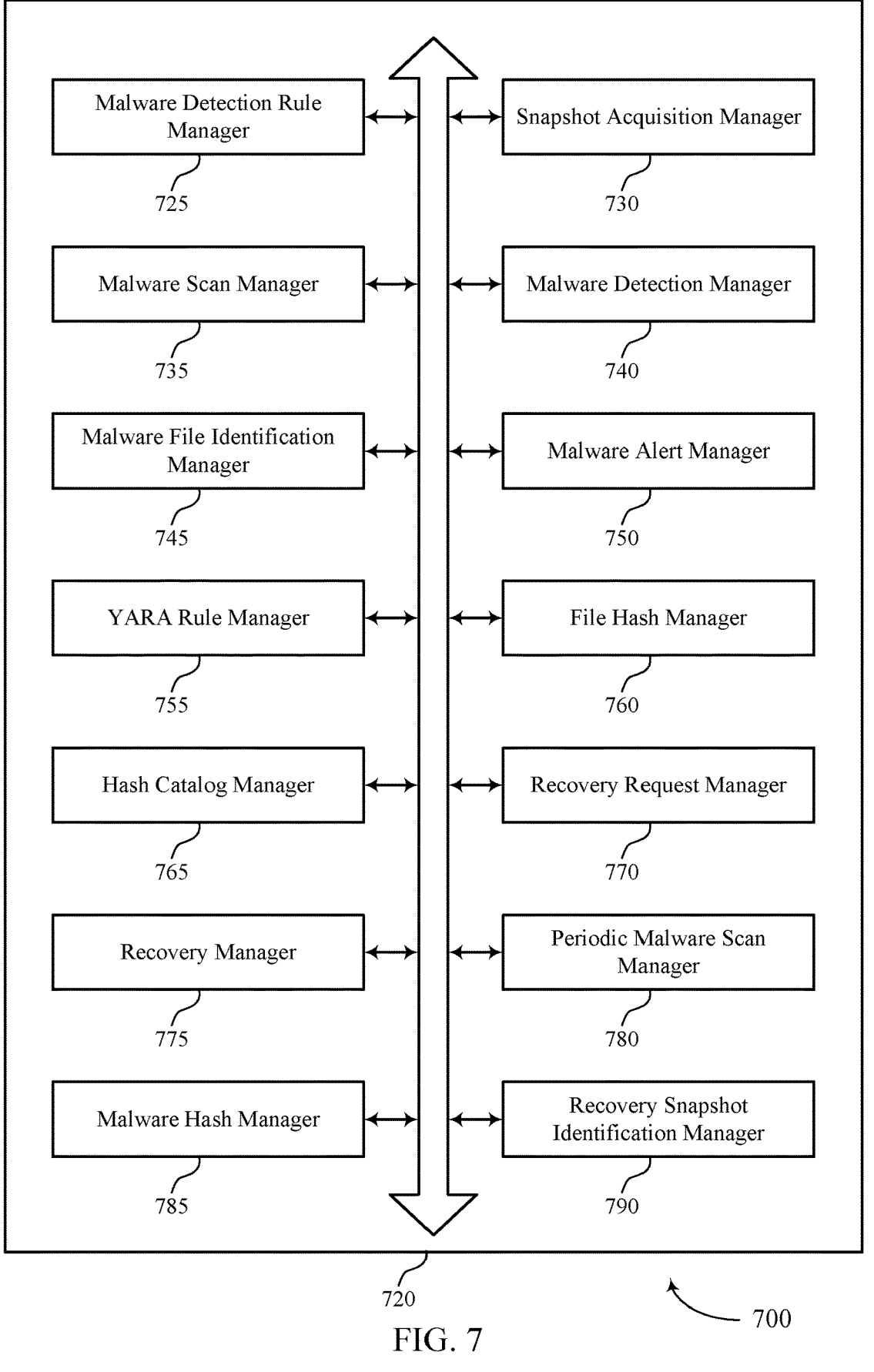
FIG. 7 shows a block diagram of a DMS manager that supports malware monitoring and detection in accordance with aspects of the present disclosure.

FIG. 7 shows a block diagram 700 of a DMS manager 720 that supports malware monitoring and detection in accordance with aspects of the present disclosure. The DMS manager 720 may be an example of aspects of a DMS or a DMS manager 620, or both, as described herein. The DMS manager 720, or various components thereof, may be an example of means for performing various aspects of malware monitoring and detection as described herein. For example, the DMS manager 720 may include a malware detection rule manager 725, a snapshot acquisition manager 730, a malware scan manager 735, a malware detection manager 740, a malware file identification manager 745, a malware alert manager 750, a YARA rule manager 755, a file hash manager 760, a hash catalog manager 765, a recovery request manager 770, a recovery manager 775, a periodic malware scan manager 780, a malware hash manager 785, a recovery snapshot identification manager 790, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The malware detection rule manager 725 may be configured as or otherwise support a means for receiving, by a DMS, an indication of a set of malware detection rules associated with a customer of the DMS. The snapshot acquisition manager 730 may be configured as or otherwise support a means for capturing, by the DMS, a first snapshot of a computing system associated with the customer. The malware scan manager 735 may be configured as or otherwise support a means for performing a check, by the DMS and based on capturing the first snapshot, of a set of files within the first snapshot based on the set of malware detection rules, where the set of files include files that have been modified or added with respect to a second snapshot of the computing system prior in time to the first snapshot. The malware detection manager 740 may be configured as or otherwise support a means for detecting, by the DMS and based on the check, that a file of the set of files includes first malware. The malware file identification manager 745 may be configured as or otherwise support a means for identifying, by the DMS based on detecting that the file includes the first malware, a temporally first snapshot of the computing system that includes the file including the first malware.

In some examples, the malware alert manager 750 may be configured as or otherwise support a means for transmitting, by the DMS to a computing device associated with an administrative account associated with the customer, an alert message including an indication that the file includes the first malware and an indication of the temporally first snapshot.

In some examples, the recovery request manager 770 may be configured as or otherwise support a means for receiving, by the DMS from the computing device and based on the alert message, a recovery request message, where the recovery request message includes an indication to perform a recovery procedure for the computing system using a recovery snapshot that is temporally prior to the temporally first snapshot. In some examples, the recovery manager 775 may be configured as or otherwise support a means for performing, by the DMS, the recovery procedure based on the recovery request message.

In some examples, the recovery snapshot identification manager 790 may be configured as or otherwise support a means for identifying, by the DMS and based on detecting that the file includes the first malware, the recovery snapshot, where the recovery snapshot is immediately prior in time to the temporally first snapshot in a chain of snapshots of the computing system, where the alert message further includes an indication of the recovery snapshot.

In some examples, the malware scan manager 735 may be configured as or otherwise support a means for performing a second check, by the DMS and based on reception of the set of malware detection rules, of respective sets of files within a respective set of most recent snapshots of a set of computing systems associated with the customer based on the set of malware detection rules, the set of computing systems including the computing system.

In some examples, the malware detection rule manager 725 may be configured as or otherwise support a means for detecting, by the DMS and based on the second check, that a second file of a respective set of files within a first most recent snapshot of the respective set of most recent snapshots corresponding to a first respective computing system of the set of computing systems includes second malware. In some examples, the malware file identification manager 745 may be configured as or otherwise support a means for identifying, by the DMS and based on detecting that the second file includes the second malware, a second temporally first snapshot of the first respective computing system that includes the second file including the second malware.

In some examples, the malware alert manager 750 may be configured as or otherwise support a means for transmitting, by the DMS to a computing device associated with an administrative account associated with the customer, an alert message including an indication that the second file includes the second malware and an indication of the second temporally first snapshot.

In some examples, the periodic malware scan manager 780 may be configured as or otherwise support a means for identifying, by the DMS, that a time period since a last check of the respective sets of files within the respective set of most recent snapshots of the set of computing systems satisfies a threshold time period, where performance of the second check is based on identifying that the time period satisfies the threshold time period.

In some examples, to support performing the second check, the YARA rule manager 755 may be configured as or otherwise support a means for scanning the respective sets of files against a set of YARA rules, the set of malware detection rules including the set of YARA rules.

In some examples, to support performing the second check, the hash catalog manager 765 may be configured as or otherwise support a means for performing a comparison of a hash catalog associated with the customer to a set of hashes indicative of malware, the set of malware detection rules including the set of hashes indicative of malware.

In some examples, to support performing the check, the YARA rule manager 755 may be configured as or otherwise support a means for scanning the set of files against a set of YARA rules, the set of malware detection rules including the set of YARA rules.

In some examples, to support performing the second check, the file hash manager 760 may be configured as or otherwise support a means for computing a respective set of hashes for the set of files. In some examples, to support performing the check, the malware hash manager 785 may be configured as or otherwise support a means for performing a comparison of the respective set of hashes to a bloom filter representative of a set of hashes indicative of malware, the set of malware detection rules including the set of hashes indicative of malware.

In some examples, the malware detection manager 740 may be configured as or otherwise support a means for identifying, based on the comparison, that a subset of hashes of the respective set of hashes match known malware. In some examples, the malware detection manager 740 may be configured as or otherwise support a means for checking a subset of the set of files corresponding to the subset of hashes against a set of known malware.

In some examples, the set of malware detection rules include a first subset of malware detection rules specific to the customer and a second subset of malware detection rules common to a set of multiple customers of the DMS.

In some examples, the malware detection rule manager 725 may be configured as or otherwise support a means for receiving, by the DMS, an indication of a second set of malware detection rules associated with a second customer of the DMS, where the second set of malware detection rules include a third subset of malware detection rules specific to the customer and the second subset of malware detection rules.

In some examples, the snapshot acquisition manager 730 may be configured as or otherwise support a means for capturing, by the DMS, a third snapshot of a second computing system associated with the second customer. In some examples, the malware scan manager 735 may be configured as or otherwise support a means for performing a second check, by the DMS and based on capturing the third snapshot, of a second set of files within the third snapshot based on the set of malware detection rules, where the second set of files include files that have been modified or added with respect to a fourth snapshot of the second computing system prior in time to the third snapshot. In some examples, the malware detection manager 740 may be configured as or otherwise support a means for detecting, by the DMS and based on the check, that a second file of the set of files includes second malware. In some examples, the malware file identification manager 745 may be configured as or otherwise support a means for identifying, by the DMS based on detecting that the second file includes the second malware, a second temporally first snapshot of the second computing system that includes the second file including the second malware.

Figure 8:
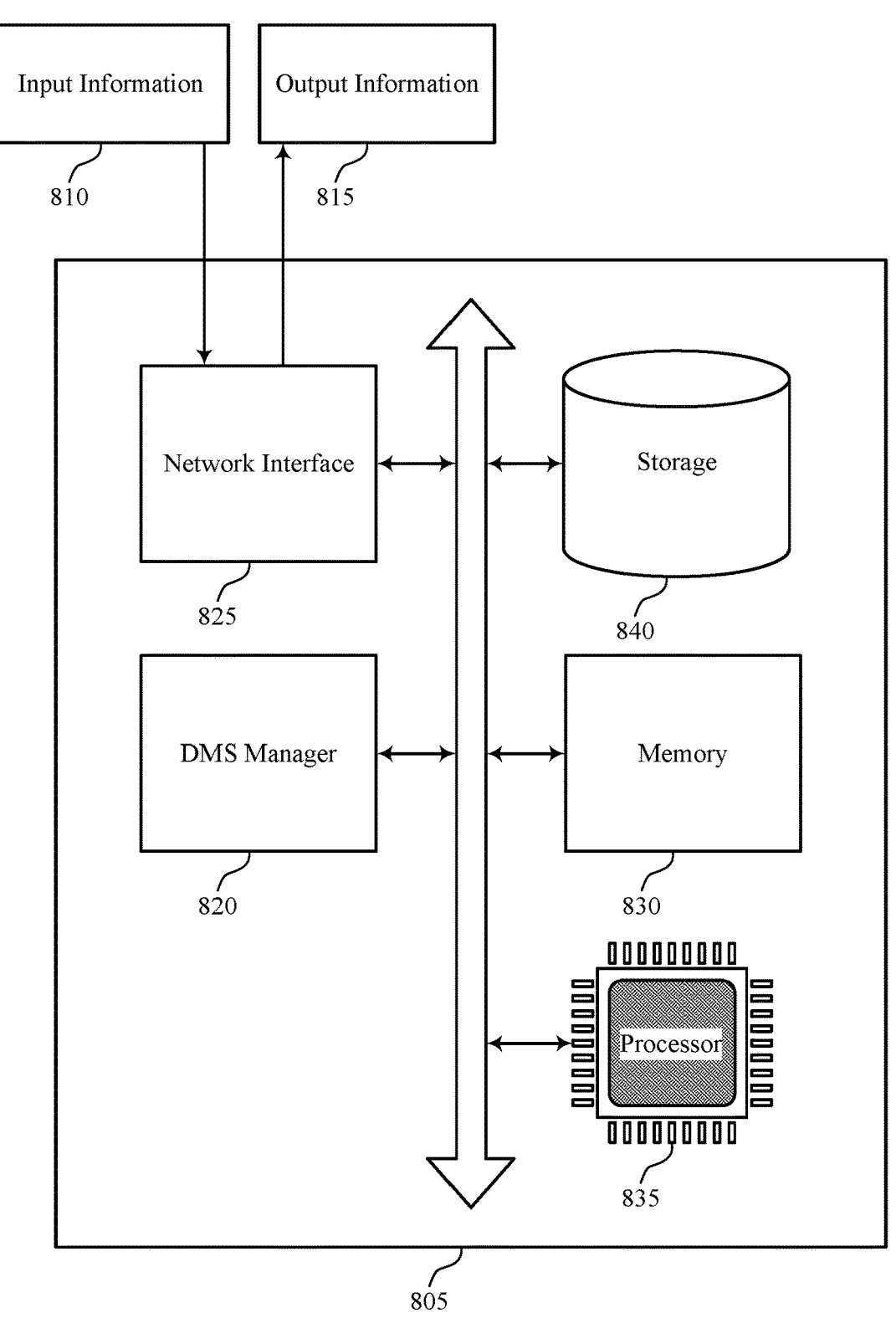
FIG. 8 shows a diagram of a system including a device that supports malware monitoring and detection in accordance with aspects of the present disclosure.

FIG. 8 shows a block diagram 800 of a system 805 that supports malware monitoring and detection in accordance with aspects of the present disclosure. The system 805 may be an example of or include components of a system 605 as described herein. The system 805 may include components for data management, including components such as a DMS manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting malware monitoring and detection). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the DMS manager 820 may be configured as or otherwise support a means for receiving, by a DMS, an indication of a set of malware detection rules associated with a customer of the DMS. The DMS manager 820 may be configured as or otherwise support a means for capturing, by the DMS, a first snapshot of a computing system associating with the customer. The DMS manager 820 may be config-ured as or otherwise support a means for performing a check, by the DMS and based on capturing the first snapshot, of a set of files within the first snapshot based on the set of malware detection rules, where the set of files include files that have been modified or added with respect to a second snapshot of the computing system prior in time to the first snapshot. The DMS manager 820 may be configured as or otherwise support a means for detecting, by the DMS and based on the check, that a file of the set of files includes first malware. DMS manager 820 may be configured as or otherwise support a means for identifying, by the DMS based on detecting that the file includes the first malware, a temporally first snapshot of the computing system that includes the file including the first malware.

By including or configuring the DMS manager 820 in accordance with examples as described herein, the system 805 may support techniques for malware monitoring and detection, which may provide one or more benefits such as, for example, improved reliability, improved user experience, more efficient utilization of computing resources, network resources or both, improved scalability, or improved secu-rity, among other possibilities.

FIG. 9 shows a flowchart illustrating a method 900 that supports malware monitoring and detection in accordance with aspects of the present disclosure. The operations of the method 900 may be implemented by a DMS or its compo-nents as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include receiving, by a DMS, an indication of a set of malware detection rules associated with a customer of the DMS. The operations of 905 may be performed in accordance with examples as disclosed herein. In some examples, aspects of the operations of 905 may be performed by a malware detection rule manager 725 as described with reference to FIG. 7.

At 910, the method may include capturing, by the DMS, a first snapshot of a computing system associated with the customer. The operations of 910 may be performed in accordance with examples as disclosed herein. In some examples, aspects of the operations of 910 may be per-formed by a snapshot acquisition manager 730 as described with reference to FIG. 7.

At 915, the method may include performing a check, by the DMS and based on capturing the first snapshot, of a set of files within the first snapshot based on the set of malware detection rules, where the set of files include files that have been modified or added with respect to a second snapshot of the computing system prior in time to the first snapshot. The operations of 915 may be performed in accordance with examples as disclosed herein. In some examples, aspects of the operations of 915 may be performed by a malware scan manager 735 as described with reference to FIG. 7.

At 920, the method may include detecting, by the DMS and based on the check, that a file of the set of files includes first malware. The operations of 920 may be performed in accordance with examples as disclosed herein. In some examples, aspects of the operations of 920 may be per-formed by a malware detection manager 740 as described with reference to FIG. 7.

At 925, the method may include identifying, by the DMS based on detecting that the file includes the first malware, a temporally first snapshot of the computing system that includes the file including the first malware. The operations of 925 may be performed in accordance with examples as disclosed herein. In some examples, aspects of the opera-tions of 925 may be performed by a malware file identifi-cation manager 745 as described with reference to FIG. 7.

FIG. 10 shows a flowchart illustrating a method 1000 that supports malware monitoring and detection in accordance with aspects of the present disclosure. The operations of the method 1000 may be implemented by a DMS or its com-ponents as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may per-form aspects of the described functions using special-pur-pose hardware.

At 1005, the method may include receiving, by a DMS, an indication of a set of malware detection rules associated with a customer of the DMS. The operations of 1005 may be performed in accordance with examples as disclosed herein. In some examples, aspects of the operations of 1005 may be performed by a malware detection rule manager 725 as described with reference to FIG. 7.

At 1010, the method may include capturing, by the DMS, a first snapshot of a computing system associated with the customer. The operations of 1010 may be performed in accordance with examples as disclosed herein. In some examples, aspects of the operations of 1010 may be per-formed by a snapshot acquisition manager 730 as described with reference to FIG. 7.

At 1015, the method may include performing a check, by the DMS and based on capturing the first snapshot, of a set of files within the first snapshot based on the set of malware detection rules, where the set of files include files that have been modified or added with respect to a second snapshot of the computing system prior in time to the first snapshot. The operations of 1015 may be performed in accordance with examples as disclosed herein. In some examples, aspects of the operations of 1015 may be performed by a malware scan manager 735 as described with reference to FIG. 7.

At 1020, the method may include detecting, by the DMS and based on the check, that a file of the set of files includes first malware. The operations of 1020 may be performed in accordance with examples as disclosed herein. In some examples, aspects of the operations of 1020 may be per-formed by a malware detection manager 740 as described with reference to FIG. 7.

At 1025, the method may include identifying, by the DMS based on detecting that the file includes the first malware, a temporally first snapshot of the computing system that includes the file including the first malware. The operations of 1025 may be performed in accordance with examples as disclosed herein. In some examples, aspects of the opera-tions of 1025 may be performed by a malware file identi-fication manager 745 as described with reference to FIG. 7.

At 1030, the method may include transmitting, by the DMS to a computing device associated with an administrative account associated with the customer, an alert message including an indication that the file includes the first malware and an indication of the temporally first snapshot. The operations of 1030 may be performed in accordance with examples as disclosed herein. In some examples, aspects of the operations of 1030 may be performed by a malware alert manager 750 as described with reference to FIG. 7.

FIG. 11 shows a flowchart illustrating a method 1100 that supports malware monitoring and detection in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include receiving, by a DMS, an indication of a set of malware detection rules associated with a customer of the DMS. The operations of 1105 may be performed in accordance with examples as disclosed herein. In some examples, aspects of the operations of 1105 may be performed by a malware detection rule manager 725 as described with reference to FIG. 7.

At 1110, the method may include capturing, by the DMS, a first snapshot of a computing system associated with the customer. The operations of 1110 may be performed in accordance with examples as disclosed herein. In some examples, aspects of the operations of 1110 may be performed by a snapshot acquisition manager 730 as described with reference to FIG. 7.

At 1115, the method may include performing a check, by the DMS and based on capturing the first snapshot, of a set of files within the first snapshot based on the set of malware detection rules, where the set of files include files that have been modified or added with respect to a second snapshot of the computing system prior in time to the first snapshot. The operations of 1115 may be performed in accordance with examples as disclosed herein. In some examples, aspects of the operations of 1115 may be performed by a malware scan manager 735 as described with reference to FIG. 7.

At 1120, the method may include detecting, by the DMS and based on the check, that a file of the set of files includes first malware. The operations of 1120 may be performed in accordance with examples as disclosed herein. In some examples, aspects of the operations of 1120 may be performed by a malware detection manager 740 as described with reference to FIG. 7.

At 1125, the method may include identifying, by the DMS based on detecting that the file includes the first malware, a temporally first snapshot of the computing system that includes the file including the first malware. The operations of 1125 may be performed in accordance with examples as disclosed herein. In some examples, aspects of the operations of 1125 may be performed by a malware file identification manager 745 as described with reference to FIG. 7.

At 1130, the method may include performing a second check, by the DMS and based on reception of the set of malware detection rules, of respective sets of files within a respective set of most recent snapshots of a set of computing systems associated with the customer based on the set of malware detection rules, the set of computing systems including the computing system. The operations of 1130 may be performed in accordance with examples as disclosed herein. In some examples, aspects of the operations of 1130 may be performed by a malware scan manager 735 as described with reference to FIG. 7.

A method by an apparatus is described. The method may include receiving, by a DMS, an indication of a set of malware detection rules associated with a customer of the DMS, capturing, by the DMS, a first snapshot of a computing system associated with the customer, performing a check, by the DMS and based on capturing the first snapshot, of a set of files within the first snapshot based on the set of malware detection rules, where the set of files include files that have been modified or added with respect to a second snapshot of the computing system prior in time to the first snapshot, detecting, by the DMS and based on the check, that a file of the set of files includes first malware, and identifying, by the DMS based on detecting that the file includes the first malware, a temporally first snapshot of the computing system that includes the file including the first malware.

An apparatus is described. The apparatus may include one or more memories storing processor executable code, and one or more processors coupled with the one or more memories. The one or more processors may individually or collectively be operable to execute the code to cause the apparatus to receive, by a DMS, an indication of a set of malware detection rules associated with a customer of the DMS, capturing, by the DMS, a first snapshot of a computing system associate with the customer, perform a check, by the DMS and based on capturing the first snapshot, of a set of files within the first snapshot based on the set of malware detection rules, where the set of files include files that have been modified or added with respect to a second snapshot of the computing system prior in time to the first snapshot, detect, by the DMS and based on the check, that a file of the set of files includes first malware, and identify, by the DMS based on detecting that the file includes the first malware, a temporally first snapshot of the computing system that includes the file including the first malware.

Another apparatus is described. The apparatus may include means for receiving, by a DMS, an indication of a set of malware detection rules associated with a customer of the DMS, means for capturing, by the DMS, a first snapshot of a computing system associated with the customer, means for performing a check, by the DMS and based on capturing the first snapshot, of a set of files within the first snapshot based on the set of malware detection rules, where the set of files include files that have been modified or added with respect to a second snapshot of the computing system prior in time to the first snapshot, means for detecting, by the DMS and based on the check, that a file of the set of files includes first malware, and means for identifying, by the DMS based on detecting that the file includes the first malware, a temporally first snapshot of the computing system that includes the file including the first malware.

A non-transitory computer-readable medium storing code is described. The code may include instructions executable by one or more processors to receive, by a DMS, an indication of a set of malware detection rules associated with a customer of the DMS, capturing, by the DMS, a first snapshot of a computing system associate with the customer, perform a check, by the DMS and based on capturing the first snapshot, of a set of files within the first snapshot based on the set of malware detection rules, where the set of files include files that have been modified or added with respect to a second snapshot of the computing system prior in time to the first snapshot, detect, by the DMS and based on the check, that a file of the set of files includes first malware, and identify, by the DMS based on detecting that the file includes the first malware, a temporally first snapshot of the computing system that includes the file including the first malware.

Some examples of the method, apparatus, and non-transitory computer-readable medium described herein may further include operations, features, means, or instructions for transmitting, by the DMS to a computing device associated with an administrative account associated with the customer, an alert message including an indication that the file includes the first malware and an indication of the temporally first snapshot.

Some examples of the method, apparatus, and non-transitory computer-readable medium described herein may further include operations, features, means, or instructions for receiving, by the DMS from the computing device and based on the alert message, a recovery request message, where the recovery request message includes an indication to perform a recovery procedure for the computing system using a recovery snapshot that may be temporally prior to the temporally first snapshot and performing, by the DMS, the recovery procedure based on the recovery request message.

Some examples of the method, apparatus, and non-transitory computer-readable medium described herein may further include operations, features, means, or instructions for identifying, by the DMS and based on detecting that the file includes the first malware, the recovery snapshot, where the recovery snapshot may be immediately prior in time to the temporally first snapshot in a chain of snapshots of the computing system, where the alert message further includes an indication of the recovery snapshot.

Some examples of the method, apparatus, and non-transitory computer-readable medium described herein may further include operations, features, means, or instructions for performing a second check, by the DMS and based on reception of the set of malware detection rules, of respective sets of files within a respective set of most recent snapshots of a set of computing systems associated with the customer based on the set of malware detection rules, the set of computing systems including the computing system.

Some examples of the method, apparatus, and non-transitory computer-readable medium described herein may further include operations, features, means, or instructions for detecting, by the DMS and based on the second check, that a second file of a respective set of files within a first most recent snapshot of the respective set of most recent snapshots corresponding to a first respective computing system of the set of computing systems includes second malware and identifying, by the DMS and based on detecting that the second file includes the second malware, a second temporally first snapshot of the first respective computing system that includes the second file including the second malware.

Some examples of the method, apparatus, and non-transitory computer-readable medium described herein may further include operations, features, means, or instructions for transmitting, by the DMS to a computing device associated with an administrative account associated with the customer, an alert message including an indication that the second file includes the second malware and an indication of the second temporally first snapshot.

Some examples of the method, apparatus, and non-transitory computer-readable medium described herein may further include operations, features, means, or instructions for identifying, by the DMS, that a time period since a last check of the respective sets of files within the respective set of most recent snapshots of the set of computing systems satisfies a threshold time period, where performance of the second check may be based on identifying that the time period satisfies the threshold time period.

In some examples of the method, apparatus, and non-transitory computer-readable medium described herein, performing the second check may include operations, features, means, or instructions for scanning the respective sets of files against a set of YARA rules, the set of malware detection rules including the set of YARA rules.

In some examples of the method, apparatus, and non-transitory computer-readable medium described herein, performing the second check may include operations, features, means, or instructions for performing a comparison of a hash catalog associated with the customer to a set of hashes indicative of malware, the set of malware detection rules including the set of hashes indicative of malware.

In some examples of the method, apparatus, and non-transitory computer-readable medium described herein, performing the check may include operations, features, means, or instructions for scanning the set of files against a set of YARA rules, the set of malware detection rules including the set of YARA rules.

In some examples of the method, apparatus, and non-transitory computer-readable medium described herein, performing the check may include operations, features, means, or instructions for co computing a respective set of hashes for the set of files and performing a comparison of the respective set of hashes to a bloom filter representative of a set of hashes indicative of malware, the set of malware detection rules including the set of hashes indicative of malware.

Some examples of the method, apparatus, and non-transitory computer-readable medium described herein may further include operations, features, means, or instructions for identifying, based on the comparison, that a subset of hashes of the respective set of hashes match known malware and checking a subset of the set of files corresponding to the subset of hashes against a set of known malware.

In some examples of the method, apparatus, and non-transitory computer-readable medium described herein, the set of malware detection rules include a first subset of malware detection rules specific to the customer and a second subset of malware detection rules common to a set of multiple customers of the DMS.

Some examples of the method, apparatus, and non-transitory computer-readable medium described herein may further include operations, features, means, or instructions for receiving, by the DMS, an indication of a second set of malware detection rules associated with a second customer of the DMS, where the second set of malware detection rules include a third subset of malware detection rules specific to the customer and the second subset of malware detection rules.

In some examples of the method, apparatus, and non-transitory computer-readable medium described herein, capturing, by the DMS, a third snapshot of a second computing system associated with the second customer, performing a second check, by the DMS and based on capturing the third snapshot, of a second set of files within the third snapshot based on the set of malware detection rules, where the second set of files include files that may have been modified or added with respect to a fourth snapshot of the second computing system prior in time to the third snapshot, detecting, by the DMS and based on the check, that a second file of the set of files includes second malware, and identifying, by the DMS based on detecting that the second file includes the second malware, a second temporally first snapshot of the second computing system that includes the second file including the second malware.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, by a data management system (DMS), an indication of a set of malware detection rules associated with a customer of the DMS;

capturing, by the DMS, a first snapshot of a computing system associated with the customer and a differential filesystem metadata file, wherein the differential filesystem metadata file includes metadata indicative of files that have been modified or added with respect to a second snapshot of the computing system, the second snapshot prior in time to the first snapshot;

performing a check, by the DMS and based at least in part on capturing the first snapshot, of a set of files within the first snapshot based at least in part on the set of malware detection rules, wherein the set of files comprises the files indicated by the differential filesystem metadata file as having been modified or added with respect to the second snapshot;

detecting, by the DMS and based at least in part on the check, that a file of the set of files comprises first malware; and identifying, by the DMS based at least in part on detecting that the file comprises the first malware, a temporally first snapshot of the computing system that includes the file comprising the first malware.

2. The method of claim 1, further comprising:

transmitting, by the DMS to a computing device associated with an administrative account associated with the customer, an alert message comprising an indication that the file comprises the first malware and an indication of the temporally first snapshot.

3. The method of claim 2, further comprising:

receiving, by the DMS from the computing device and based at least in part on the alert message, a recovery request message, wherein the recovery request message comprises an indication to perform a recovery procedure for the computing system using a recovery snapshot that is temporally prior to the temporally first snapshot; and performing, by the DMS, the recovery procedure based at least in part on the recovery request message.

4. The method of claim 3, further comprising:

identifying, by the DMS and based at least in part on detecting that the file comprises the first malware, the recovery snapshot, wherein the recovery snapshot is prior in time to the temporally first snapshot in a chain of snapshots of the computing system, and wherein the alert message further comprises an indication of the recovery snapshot.

5. The method of claim 1, further comprising:

performing a second check, by the DMS and based at least in part on reception of the set of malware detection rules, of respective sets of files within a respective set of most recent snapshots of a set of computing systems associated with the customer based at least in part on the set of malware detection rules, the set of computing systems comprising the computing system.

6. The method of claim 5, further comprising:

detecting, by the DMS and based on the second check, that a second file of a respective set of files within a first most recent snapshot of the respective set of most recent snapshots corresponding to a first respective computing system of the set of computing systems comprises second malware; and identifying, by the DMS and based on detecting that the second file comprises the second malware, a second temporally first snapshot of the first respective computing system that includes the second file comprising the second malware.

7. The method of claim 6, further comprising:

transmitting, by the DMS to a computing device associated with an administrative account associated with the customer, an alert message comprising an indication that the second file comprises the second malware and an indication of the second temporally first snapshot.

8. The method of claim 5, further comprising:

identifying, by the DMS, that a time period since a last check of the respective sets of files within the respective set of most recent snapshots of the set of computing systems satisfies a threshold time period, wherein performance of the second check is based at least in part on identifying that the time period satisfies the threshold time period.

9. The method of claim 5, wherein performing the second check comprises:

scanning the respective sets of files against the set of malware detection rules.

10. The method of claim 5, wherein performing the second check comprises:

performing a comparison of a hash catalog associated with the customer to a set of hashes indicative of malware, the set of malware detection rules comprising the set of hashes indicative of malware.

11. The method of claim 1, wherein performing the check comprises:

scanning the set of files against the set of malware detection rules.

12. The method of claim 1, wherein performing the check comprises:

computing a respective set of hashes for the set of files; and performing a comparison of the respective set of hashes to a bloom filter representative of a set of hashes indicative of malware, the set of malware detection rules comprising the set of hashes indicative of malware.

13. The method of claim 12, further comprising:

identifying, based at least in part on the comparison, that a subset of hashes of the respective set of hashes match known malware; and checking a subset of the set of files corresponding to the subset of hashes against a set of known malware.

14. The method of claim 1, wherein the set of malware detection rules comprise a first subset of malware detection rules specific to the customer and a second subset of malware detection rules common to a plurality of customers of the DMS.

15. The method of claim 14, further comprising:

receiving, by the DMS, an indication of a second set of malware detection rules associated with a second customer of the DMS, wherein the second set of malware detection rules comprise a third subset of malware detection rules specific to the customer and the second subset of malware detection rules.

16. The method of claim 15, further comprising:

capturing, by the DMS, a third snapshot of a second computing system associated with the second customer;

performing a second check, by the DMS and based at least in part on capturing the third snapshot, of a second set of files within the third snapshot based at least in part on the set of malware detection rules, wherein the second set of files comprise files that have been modified or added with respect to a fourth snapshot of the second computing system prior in time to the third snapshot;

detecting, by the DMS and based at least in part on the check, that a second file of the set of files comprises second malware; and identifying, by the DMS based at least in part on detecting that the second file comprises the second malware, a second temporally first snapshot of the second computing system that includes the second file comprising the second malware.

17. An apparatus, comprising:

one or more memories storing processor-executable code; and one or more processors coupled with the one or more memories and individually or collectively operable to execute the code to cause the apparatus to:

receive, by a data management system (DMS), an indication of a set of malware detection rules associated with a customer of the DMS;

capture, by the DMS, a first snapshot of a computing system associated with the customer and a differential filesystem metadata file, wherein the differential filesystem metadata file includes metadata indicative of files that have been modified or added with respect to a second snapshot of the computing system, the second snapshot prior in time to the first snapshot;

perform a check, by the DMS and based at least in part on capturing the first snapshot, of a set of files within the first snapshot based at least in part on the set of malware detection rules, wherein the set of files comprises the files indicated by the differential filesystem metadata file as having been modified or added with respect to the second snapshot;

detect, by the DMS and based at least in part on the check, that a file of the set of files comprises first malware; and identify, by the DMS based at least in part on detecting that the file comprises the first malware, a temporally first snapshot of the computing system that includes the file comprising the first malware.

18. The apparatus of claim 17, wherein the one or more processors are individually or collectively further operable to execute the code to cause the apparatus to:

transmit, by the DMS to a computing device associated with an administrative account associated with the customer, an alert message comprising an indication that the file comprises the first malware and an indication of the temporally first snapshot.

19. The apparatus of claim 18, wherein the one or more processors are individually or collectively further operable to execute the code to cause the apparatus to:

receive, by the DMS from the computing device and based at least in part on the alert message, a recovery request message, wherein the recovery request message comprises an indication to perform a recovery procedure for the computing system using a recovery snapshot that is temporally prior to the temporally first snapshot; and perform, by the DMS, the recovery procedure based at least in part on the recovery request message.

20. A non-transitory computer-readable medium storing code, the code comprising instructions executable by one or more processors to:

receive, by a data management system (DMS), an indication of a set of malware detection rules associated with a customer of the DMS;

capture, by the DMS, a first snapshot of a computing system associated with the customer and a differential filesystem metadata file, wherein the differential filesystem metadata file includes metadata indicative of files that have been modified or added with respect to a second snapshot of the computing system, the second snapshot prior in time to the first snapshot;

perform a check, by the DMS and based at least in part on capturing the first snapshot, of a set of files within the first snapshot based at least in part on the set of malware detection rules, wherein the set of files comprises the files indicated by the differential filesystem metadata file as having been modified or added with respect to the second snapshot;

detect, by the DMS and based at least in part on the check, that a file of the set of files comprises first malware; and identify, by the DMS based at least in part on detecting that the file comprises the first malware, a temporally first snapshot of the computing system that includes the file comprising the first malware.

* * * * *